US012784090B2

(12) United States Patent
Alizadeh et al.

(10) Patent No.: US 12,784,090 B2
(45) Date of Patent: Nov. 3, 2026

(54) ADAPTIVE RECOMMENDATION SYSTEM FOR GENERATING NEXT BEST SUGGESTIONS THROUGH DYNAMIC USER QUERY INTERPRETATION

(71) Applicant: Walmart Apollo, LLC, Bentonville, AR (US)

(72) Inventors: Morteza Alizadeh, Carrollton, TX (US); Neeraj Sharma, Irving, TX (US); Venkata Phani Kumar Boggavarapu, San Ramon, CA (US); Frederick Lee, Plano, TX (US); Yogananda Domlur Seetharama, Mississauga (CA)

(73) Assignee: Walmart Apollo, LLC, Bentonville, AR (US)

( * ) Notice: Subject to any disclaimer, the term of this patent is extended or adjusted under 35 U.S.C. 154(b) by 188 days.

(21) Appl. No.: 18/661,667

(22) Filed: May 12, 2024

(65) Prior Publication Data

US 2025/0348917 A1 Nov. 13, 2025

(51) Int. Cl.
*G06Q 30/00* (2023.01)
*G06Q 30/0601* (2023.01)

(52) U.S. Cl.
CPC ..... *G06Q 30/0631* (2013.01); *G06Q 30/0643* (2013.01)

(58) Field of Classification Search
CPC ....................... G06Q 30/0631; G06Q 30/0643
See application file for complete search history.

(56) References Cited

U.S. PATENT DOCUMENTS

| | | | |
|---|---|---|---|
| 10,706,450 | B1 | 7/2020 | Tavernier |
| 11,748,413 | B1 | 9/2023 | Yoon et al. |
| 2010/0082649 | A1 | 4/2010 | Gutt et al. |

(Continued)

OTHER PUBLICATIONS

Gangadharan, Kapilya, et al. "From data to decisions: the transformational power of machine learning in business recommendations." arXiv preprint arXiv:2402.08109 (2024). (Year: 2024).*

(Continued)

*Primary Examiner* — Anand Loharikar
(74) *Attorney, Agent, or Firm* — Foley IP Law, PLLC

(57) ABSTRACT

Examples provide improved methods for generating search recommendations in response to a user-initiated search. Examples include receiving a search request including search terms; identifying one or more product categories as output from a machine learning classification model; identifying products that are assigned to those product categories, including product titles short descriptions in a natural language; applying the product titles and short descriptions as input to a second machine learning model that is configured to generate recommended searches; scoring each recommended search of the plurality of recommended searches; selecting one or more recommended searches of the plurality of recommended searches based on the scoring; and causing the one or more recommended searches to be displayed as user-interactable components on a graphical user interface, each user-interactable component being configured to execute a second search request upon user interaction with the user-interactable component.

20 Claims, 8 Drawing Sheets

(56) References Cited

U.S. PATENT DOCUMENTS

2025/0124483 A1* 4/2025 Wu ...................... G06F 16/906

OTHER PUBLICATIONS

Qi, S. et al. "Location aware keyword query suggestion based on document proximity," 2016 IEEE 32nd International Conference on Data Engineering (ICDE), Helsinki, Finland, 2016, pp. 1566-1567.
Uma, N., et al., "Query Recommendation for Search Engine Results Using Machine Learning", Recent Developments in Electronics and Communication Systems KVS Ramachandra Murthy et al., 2023, pp. 7-12.

* cited by examiner

ADAPTIVE RECOMMENDATION SYSTEM FOR GENERATING NEXT BEST SUGGESTIONS THROUGH DYNAMIC USER QUERY INTERPRETATION

BACKGROUND

In the field of e-commerce, virtual marketplaces are hosted to facilitate online transactions. There are a few features typically provided for the end user to locate a product, such as a search feature and various browsing features. The browsing features typically allow the user to look through items in a database of products offered by the marketplace. The search feature is often implemented with a search bar into which the user enters one or more search terms. The database is searched for products that match the searched term(s) and those matching products are then displayed to the user. The marketplace may also provide a filter feature. The filter feature allows the user to limit products based on some selected criteria, such as a specific brand or category of product.

Upon searching or browsing products, the user may be presented with a list of products containing some information to identify which products they are viewing, such as a picture of the product, a product description, a price, or other such product details. Once a user has found a product of interest, the user can click on the product to direct the user to a product detail page or click an 'add to cart' button to purchase the product.

SUMMARY

Some examples provide a search recommendations system. The system includes at least one processor; and at least one memory comprising computer-readable instructions, the at least one processor, the at least one memory and the computer-readable instructions configured to cause the at least one processor to: receive a first search request, the first search request including one or more search terms; identify one or more product categories as output from a machine learning classification model in response to inputting of the one or more search terms; identify a first plurality of products that are assigned to the one or more product categories, each product of the first plurality of products identifying a plurality of product titles and a plurality of product short descriptions in a natural language; apply the plurality of product titles and the plurality of product short descriptions as input to a second machine learning model that is configured to generate a plurality of recommended searches, each recommended search of the plurality of recommended searches including at least one search term; score each recommended search of the plurality of recommended searches; select one or more recommended searches of the plurality of recommended searches based on the scoring; and cause the one or more recommended searches to be displayed as user-interactable components on a graphical user interface, each user-interactable component being configured to execute a second search request upon user interaction with the user-interactable component.

Other examples provide a computer-implemented method for generating search recommendations in response to a user-initiated search. The method includes: receiving a first search request, the first search request including one or more search terms; identifying one or more product categories as output from a machine learning classification model in response to inputting of the one or more search terms; identifying a first plurality of products that are assigned to the one or more product categories, each product of the first plurality of products including a plurality of product titles and a plurality of product short descriptions in a natural language; applying the plurality of product titles and the plurality of product short descriptions as input to a second machine learning model that is configured to generate a plurality of recommended searches, each recommended search of the plurality of recommended searches including at least one search term; scoring each recommended search of the plurality of recommended searches; selecting one or more recommended searches of the plurality of recommended searches based on the scoring; and causing the one or more recommended searches to be displayed as user-interactable components on a graphical user interface, each user-interactable component being configured to execute a second search request upon user interaction with the user-interactable component.

Still other examples provide a computer storage medium having computer-executable instructions that, upon execution by a processor of a computer, cause the processor to at least: receive a first search request, the first search request including one or more search terms; identify one or more product categories as output from a machine learning classification model in response to inputting of the one or more search terms; identify a first plurality of products that are assigned to the one or more product categories, each product of the first plurality of products identifying a plurality of product titles and a plurality of product short descriptions in a natural language; apply the plurality of product titles and the plurality of product short descriptions as input to a second machine learning model that is configured to generate a plurality of recommended searches, each recommended search of the plurality of recommended searches including at least one search term; score each recommended search of the plurality of recommended searches; select one or more recommended searches of the plurality of recommended searches based on the scoring; and cause the one or more recommended searches to be displayed as user-interactable components on a graphical user interface, each user-interactable component being configured to execute a second search request upon user interaction with the user-interactable component.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings. Any of the figures may be combined into a single example or embodiment.

DETAILED DESCRIPTION

Figure 1:
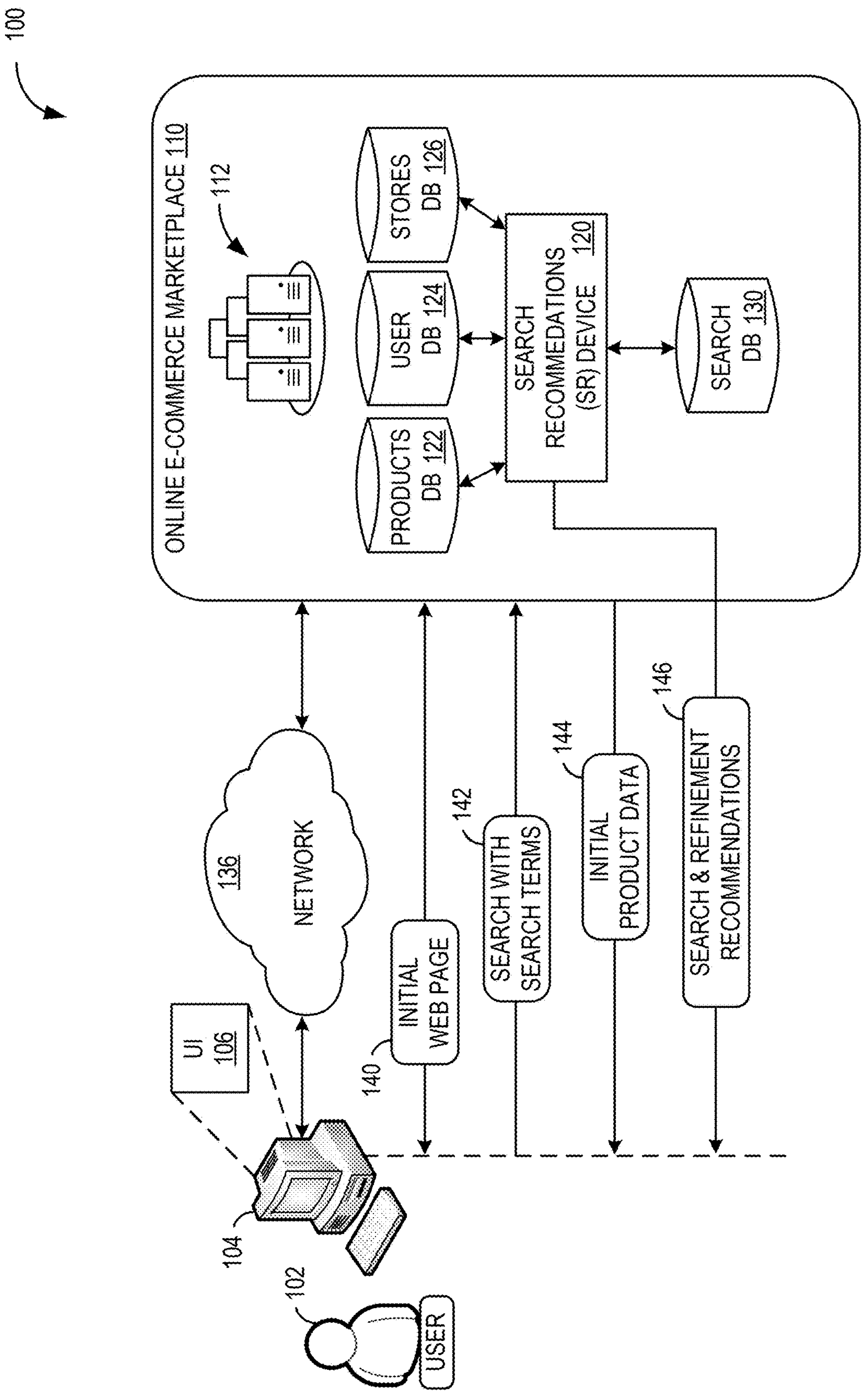
FIG. 1 is an architecture diagram illustrating an exemplary online e-commerce system for providing search recommendations and refinements in an online e-commerce environment.

A more detailed understanding can be obtained from the following description, presented by way of example, in conjunction with the accompanying drawings. The entities, connections, arrangements, and the like that are depicted in, and in connection with the various figures, are presented by way of example and not by way of limitation. As such, any and all statements or other indications as to what a particular figure depicts, what a particular element or entity in a particular figure is or has, and any and all similar statements, that can in isolation and out of context be read as absolute and therefore limiting, can only properly be read as being constructively preceded by a clause such as "In at least some examples, . . . " For brevity and clarity of presentation, this implied leading clause is not repeated ad nauseum.

One issue users can encounter while searching for products on an online e-commerce marketplaces is that, to find a particular product of interest, the user often has to perform several searches or filters before the desired product is found. For example, some users may not be able to provide quality search terms that can quickly guide the search to the desired product. Further, some users may not know how to use the various filter features that may be provided by the marketplace, or the filter features may be difficult to use. In such situations, the user may perform multiple searches and/or filters in an effort to find the product. Further, in many situations, this oblique search effort may not even result in success, as some searches may fail to find the desired product. Such searches result in extra load on the e-commerce marketplace and supporting infrastructure, as each of the extra search and filter operations cause additional computational processing load and network communications.

An example search recommendations system generates and displays refinement recommendations and/or search recommendations in an online e-commerce marketplace. During a user-initiated search, a user inputs one or more initial search terms (e.g., "bread" or "bottled water") into a search field while browsing the marketplace. The marketplace performs an initial query of a products database using the initial search terms and displays the resulting products to the user.

In addition to the search field, the search recommendations system also provides several additional search and refinement features that can assist the user during their online search experience. In examples, the system generates and displays refinement recommendations and/or search recommendations based on the initial search terms. Refinement recommendations are recommendations that further refine or limit their current search (e.g., further restricting the initial search to a subset of those initial products). Search recommendations are recommendations that cause a different search to be performed (e.g., showing a different set of products). The system displays these refinement recommendations and/or search recommendations to the user during their initial search (e.g., showing the recommendations as buttons on a recommendations bar somewhere within the web page).

Upon the user clicking on any one of these recommendations buttons, the system updates the web page based on that particular recommendation. More specifically, in the case of refinement recommendations, the system applies one or more filters to the existing product set to generate a refined product set (e.g., some subset of the already-displayed products). In the case of search recommendations, the system performs a new search using a new set of search terms associated with that particular search recommendation button, thus causing a new set of products to be displayed to the user.

In examples, the search recommendations system implements several ranking methods to determine numerous refinements for various common searches. For example, one common user-initiated search may be for bread (e.g., where "bread" is entered as a search term in a search window). The system computes refinement recommendations for the "bread" search (e.g., filters such as "sandwich bread", "rolls", or the like), as well as search recommendations for that same "bread" search (e.g., other searches with additional or different search terms, such as "Italian bread", "wheat bread", or the like). These recommendations are determined using machine learning features for query classification and keyword extraction, as well as various factors such as, for example, semantic similarity scores, featured product refinements, user interaction data (e.g., historical search and browse user interactions with the marketplace and the resulting conversion and/or value of those interactions), merchant locations (e.g., potentially different recommendations for different stores), and individual user data (e.g., historical preferences, purchase history, individual user interaction data, preferred store, and the like). The system uses these factors to score various potential recommendations and to select a particular set of recommendations that are shown to the user.

FIG. 1 is an architecture diagram illustrating an exemplary online e-commerce system (or just "system") 100 for providing search recommendations and refinements in an online e-commerce environment. In an example, a user 102 interacts with an online e-commerce marketplace 110 while searching for products to purchase. During their online shopping experience, the user 102 enters search terms into a search field provided by the marketplace 110, and the marketplace 110 displays a set of products in response to that initial search. However, these initial search results may not include the product(s) desired by the user. As such, the marketplace 110 also provides search and refined search requests for the user 102. These search and refined search requests can improve the search experience or browse experience for the user 102 by helping to guide the search toward the products of interest.

In the example, the user 102 interacts with the marketplace 110 via a user computing device 104 (e.g., a desktop computer, laptop, tablet, mobile device, or the like). The marketplace 110 may be executed on any computing architecture 112 sufficient to enable the systems and methods described herein, such as a cloud architecture, client/server architecture, or the like. The marketplace 110 provides a user interface (UI) 106 for the user 102, such as via a website (e.g., via hypertext transfer protocol (HTTP) and hypertext markup language (HTML) content) or via a mobile app, and over a network 136 such as the Internet. During an online shopping experience, the marketplace 110 provides an initial web page 140 in which the user 102 utilizes the UI 106 to search for products or services they wish to purchase. For example, the web page 140 may provide a search field into which the user 102 can input one or more search terms. Upon submission of this search 142 with search terms, the search 142 is received and processed by the marketplace 110, returning an initial set of products (e.g., initial product data 144) for display to the user 102.

In addition, the marketplace 110 also identifies a set of search and refined search requests 146 that are also displayed to the user 102 along with the initial search results. These recommendations are generated by a component of the marketplace 110, namely a search recommendations (SR) device 120. In this example, the SR device 120 accesses a search database (DB) 130 that stores both search recommendations and refined search requests that are predetermined for common searches (e.g., for the 1,000 most popular historic searches performed on the marketplace 110). Recommendations stored by the SR device 120 may also be based on aspects of user data (e.g., user interaction data, individual user data stored in a user DB 124) or aspects of store data (e.g., product performance at particular merchant locations stored in a stores DB 126). If the received search 142 matches an existing entry in the search DB 130 (e.g., there are recommendations available for those particular search terms), then the SR device 120 provides those particular recommendations as the search and refined search requests 146. If the search does not match an existing entry in the search DB 130, the SR device 120 does not provide any recommendations, in some examples. In other examples, if the search does not match an existing entry in the search DB 130, the SR device 120 dynamically determines the search and refined search requests based on the search terms provided in the search 142.

Figure 2:
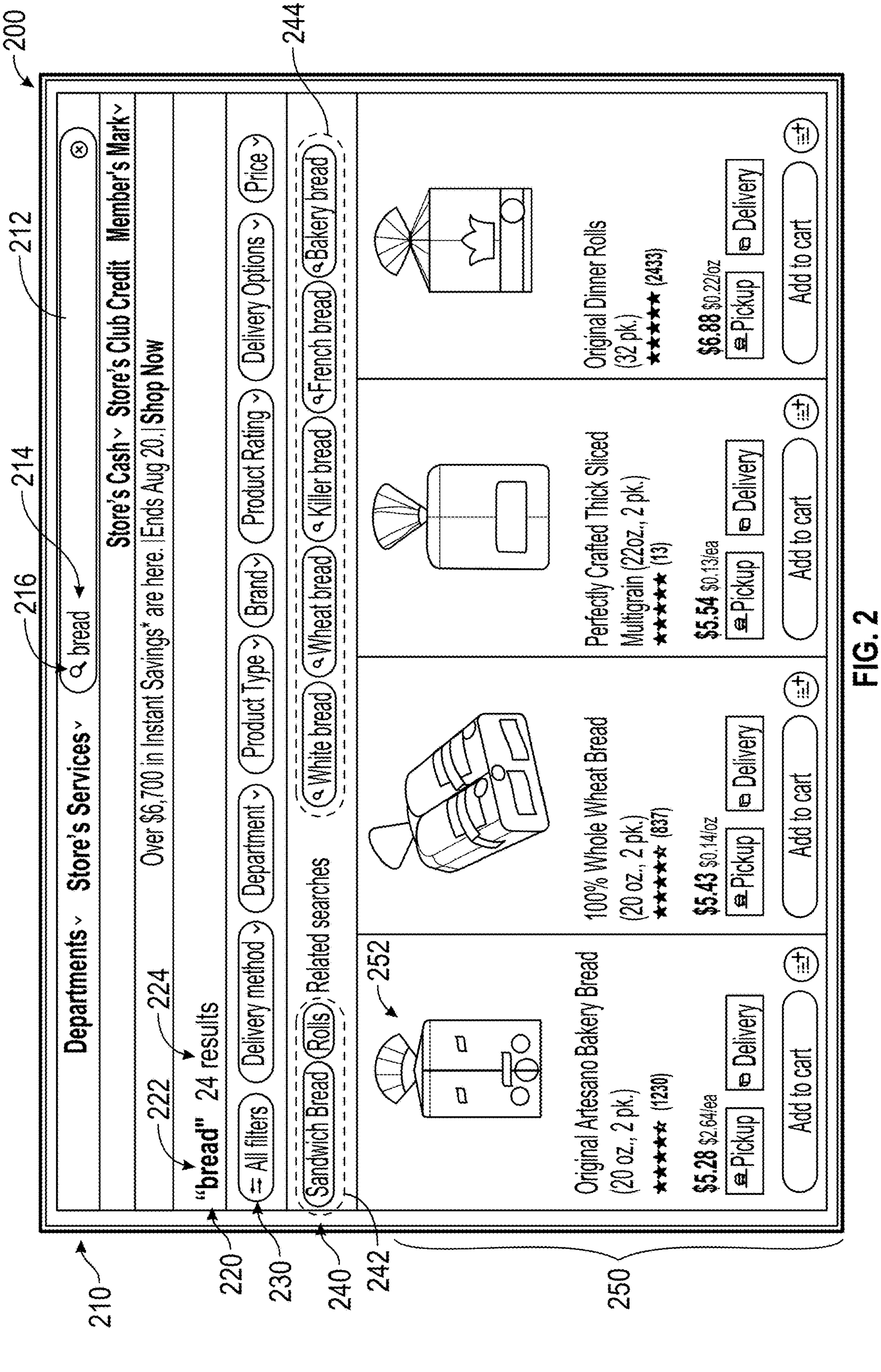
FIG. 2 is a diagram illustrating an exemplary user interface (UI) for providing search results, recommendations, and refinements in an online e-commerce environment such as the e-commerce system shown in FIG. 1.

Refined search requests are recommendations that further refine or limit the current search 142 of the user 102. Each refinement recommendation includes a set of one or more filters that, upon activation, further restrict the initial product data 144 shown to the user 102. Search recommendations are recommendations that cause a different search to be performed (e.g.,). Each search recommendation includes a set of search terms that, upon activation, cause another search to be performed (e.g., a search distinct from the search 142 initially performed by the user 102, and perhaps showing a different set of products). These search and refined search requests 146 are displayed via the UI 106 (e.g., along with the initial product data 144) as buttons on a recommendations bar somewhere within the web page. FIG. 2 illustrates an example UI 106 that includes the refined search requests 146.

As such, when the user 102 clicks on one of the refinement recommendations buttons provided in the recommendations stored by the SR device 120, the marketplace 110 filters the product set shown in the initial product data 144 to a subset of those products (e.g., applying the filter(s) identified in the refinement recommendation). When the user 102 clicks on one of the search recommendations buttons provided in the recommendations stored by the SR device 120, the marketplace 110 performs a new search of the products DB 122, thus replacing the initial product data 144 with the results of the new search. These recommendations are automatically selected by the SR device 120 to be the most likely recommendations to assist the user 102 to arrive that their products of interest based on various considerations and rankings performed by the system 100. FIG. 2 provides additional user interface details (e.g., of UI 106) in which the user 102 submits user searches 142 through the marketplace 110, during which the search and refinement recommendations 146 are generated by the SR device 120 and displayed in the user interface. FIG. 3 to FIG. 6 provide further technical details into how the SR device 120 determines search recommendations.

FIG. 2 is a diagram illustrating an exemplary user interface (UI) 200 for providing search results, recommendations, and refinements in an online e-commerce environment such as the e-commerce system 100 shown in FIG. 1. In some examples, the UI 200 is similar to the UI 106 shown in FIG. 1. In the example shown in FIG. 2, the UI 200 is shown as HTML content as displayed to the user 102 via their personal computing device 104 (e.g., through a web browser, or the like). Further, it is presumed that UI 200 is what is displayed after the initial web page 140, search 142 with search terms, initial product data 144, and search & refinement recommendations are performed as shown in FIG. 1. As such, the UI 200 shows one example result of what is produced by the marketplace 110 and what is shown to the user 102 after one example search. While this example is shown as HTML content, it should be understood that any content delivery method may be used that allows the systems and methods described herein. Further, any or all of the content shown in UI 200 may be provided by the search recommendations device 120, products DB 122, or any other component of the system 100.

In the example shown in FIG. 2, the user 102 enters a search 142 into a search field 212 provided by the marketplace 110 (e.g., in a header row along the top of the UI 200). The search field 212 allows the user 102 to input search terms 214 into the search field 212. The search field 212 may be provided to the user 102 within the initial web page 140. In this example, the user enters the search term "bread" into the search field 212 and submits a search for products related to bread (e.g., by clicking a search button 216, by pressing enter after inputting the terms into the search field 212, or the like). It should be understood that many of the other components shown in FIG. 2 are displayed as a result of the submission of this user search.

More specifically, and in response to this example user-initiated search submission, the marketplace 110 receives the search 142 and performs a product query from the products DB 122 (e.g., searching for products related to "bread"). In this example search, the UI displays a search summary row 220 that identifies current search terms 222 being used during the current search (e.g., "bread"), as well as a results count 224 identifying how many products were found during the query. In this example, the query performed by the marketplace 110 identifies 24 products, as shown by the results count 224.

Further, as a part of this query, the marketplace 110 also retrieves some product data for each of the products. More specifically, the UI 200 displays the product data for each product in the search result section 250. This search results section 250 includes a product card 252 for each product that match the current search term 222 (e.g., the 24 products of the initial query results). Each product card 252 displays information about the listed product, such as a product image, a product name, a product short description, a product rating, a product price, and the like. Further, each product card 252 may also include interactive elements (e.g., buttons, interactive images, or the like) that allow the user 102 to perform additional functionality associated with that particular product, such as viewing additional details about the product (e.g., via clicking the product image) or adding that product to their cart (e.g., via clicking an "add to card" button). In this example, only four individual products are shown here, but it should be understood that additional product cards 252 may be provided off-screen below.

Further, the UI 200 also includes a static filters row 230. This static filters row 230 provides multiple filter drop-down buttons (e.g., "Delivery method", "Department", "Product Type", and so forth), each of which allows the user 102 to refine this search through application of one or more pre-determined filters in one or more pre-determined filter categories.

Additionally, to better aid the user 102 in their search experience, the UI 200 also provides a recommendation bar 240. The recommendations bar 240 provides particular search recommendations that are dynamically determined by the marketplace 110 in response to this particular search 142. In the example, the recommendations bar 240 provides both refinement recommendations 242 and search recommendations 244. Refinement recommendations 242 represent particular filters that are recommended to help the user 102 refine their existing search (e.g., narrow down the 24 existing products to some subset of products). Search recommendations 244 represent new searches that are recommended to help the user 102 to generate a new search (e.g., generate a new set of products that may be more pertinent or specific to what the user 102 may be looking for).

In the example shown here, two refinement recommendations 242 (e.g., "Sandwich Bread" and "Rolls") and five search recommendations 244 (e.g., "White bread", "Wheat bread", "Dave's killer bread", "French bread", "Bakery bread") are shown as a result of this initial search. Each of the individual recommendations in the recommendations bar 240 is displayed in the UI 200 as a user-interactable button that, upon activation by the user 102, either perform a refinement to the existing search (e.g., apply one or more filters) or perform a new search (e.g., perform a new search query using different search terms), respectively.

The user 102 may click on one of the refinement recommendations 242 to narrow down the current search count, thus allowing for the user 102 to see products that better match what they are looking for. For example, if the user 102 were searching for a selection of rolls or sandwich bread, they could click on one of these refinement recommendations 242 to add some recommended filter to the search (e.g., limiting the type of products shown in the search results section 250).

Alternatively, the user 102 may click on one of the search recommendations (or "related searches") 244, thus causing a different search to be performed (e.g., ideally showing products more related to what they are looking for). For example, if the user 102 is searching for some particular manufacturer's French bread, they could click on the "French Bread" recommendation 244, thus causing a new search to be performed (e.g., with the search terms "French bread"), and the search results section 250 to be recreated with those resulting products (e.g., French breads from various merchants). In either case, the recommendations 242, 244 provided on the recommendations bar 240 can give the user 102 two different methods of helping to direct their search efforts.

The recommendations 244 provided on the recommendations bar 240 are dynamically determined by the marketplace 110 (e.g., by the SR device 120) based on the current search. More specifically, these recommendations 244 are determined and selected for inclusion in the recommendations bar 240 based on the current search terms as well as potentially various other factors, such as semantic similarity scores, featured product refinements, user interaction data (e.g., historical search and browse user interactions with the marketplace and the resulting conversion and/or value of those interactions), merchant locations (e.g., potentially different recommendations for different stores), and individual user data (e.g., historical preferences, purchase history, individual user interaction data, preferred store, and the like). The SR device 120 may use these factors to score various potential recommendations 244 and to select a particular set of recommendations that are shown to the user 102 on the UI 200. FIG. 3 to FIG. 6 describe further details regarding how the SR device 120 determines search recommendations 244.

Figure 3:
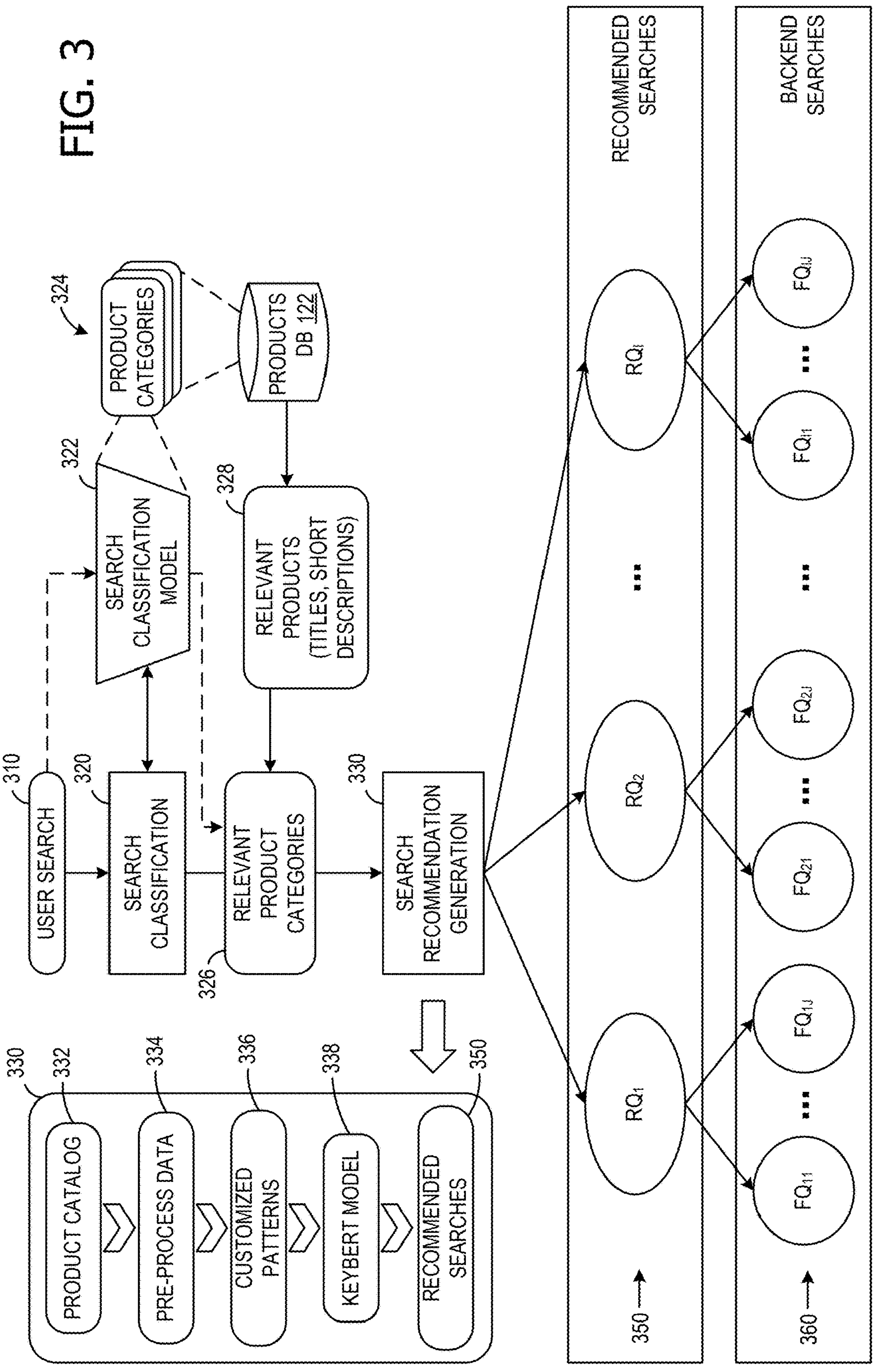
FIG. 3 is a data flow diagram illustrating a process and associated data components for generating search recommendations in response to a user search.

FIG. 3 is a data flow diagram 300 illustrating a process and associated data components for generating search recommendations 244 in response to a user search 310. In some examples, the operations shown and described in relation to FIG. 3 to FIG. 6 are performed by the search recommendations device 120, and the user search 310 is similar to the search 142 with search terms (shown in FIG. 1) and includes the user input terms 214 (e.g., "bread", as shown in FIG. 2) provided by the user 102. In these examples, the SR device 120 generates a set of recommended searches 350, as well as one or more backend searches 360 for each particular recommended query 350. Each particular recommended search 350 represents what is (or could be) displayed as a single search recommendation 244 in the UI 200 (e.g., the terms that are shown in the particular button, such as "Wheat bread"). Each particular backend search 360 for a given recommended search 350 represents a complete list of search terms that are used to perform a new search if the user 102 clicks on that particular search recommendation 244 (e.g., "wheat bread", "whole wheat bread", "wheat bread 2-pk", or the like). For example, each recommended search query is associated with a backend search query. The backend search query, or backend search, is generated based on a combination of the terms in the user query and the terms in the recommended search query. In other words, the recommendation system escalates the backend search based on the system observation of the user search terms and the recommended search terms in the reference product's title and short description.

Since a recommended search query may appear in the title and/or the short description of various products, there may be multiple backend search queries associated with a single recommendation search query. The system leverages the Mean Reciprocal Rank (MRR) score of these queries to rank the backend search queries and select a top query. The process for generating these recommended searches 350 and their associated backend searches 360 are described below.

More specifically, in the example, the user search 310 (e.g., search term "bread") is received by the SR device 120. At operation 320, the SR device 120 performs search classification using the user search 310 (e.g., based on the search terms 214). The search classification of operation 320 uses a search classification model 322 to identify one or more relevant product categories 326 based on the user search 310. In this example, the search classification model 322 is a Bidirectional Encoder Representations from Transformers (BERT) language model that is trained to classify natural language inputs (e.g., the natural language-based search terms of user search 310) with regard to a set of product categories 324. A dataset of relevant categories for queries is generated using historical interaction data, and queries are mapped to top relevant categories. This generated dataset of relevant queries is used to train a classifier, and the classifier generates scores for each individual category. Based on a threshold score, relevant categories are selected through prediction. For example, presume the marketplace 110 defines a set of 500 product categories for the products that are sold by the marketplace 110 (e.g., where each particular retail product can be assigned to one or more of the product categories 324). As such, the search classification model 322 is configured to take one or more search terms as inputs and generate one or more product categories 324 as the most relevant product categories given these search terms (shown here as relevant product categories 326).

Once the relevant product categories 326 for this user search 310 are identified, the SR device 120 identifies all of the products assigned to any of the relevant product categories 326 (e.g., as defined in products DB 122). This set of products is illustrated in FIG. 3 as relevant products 328. It should be appreciated that "relevant products" include individual products and/or product categories that are relevant to the user's initial search request. The SR device 120 also retrieves particular product data from the products DB 122 for each of the relevant products 328. In this example, the SR device 120 queries the products DB 122 for at least a title and a short description of each relevant product 328.

Continuing this example user search 310, presume that the application of the user search 310 (e.g., "bread") to the search classification model 322 generates a list of seven relevant product categories 326 (e.g., "French bread", "breakfast bread", "baguettes", "naan bread", "hoagies", "rolls", and "sandwich bread"). As such, the SR device 120 identifies all of the products associated with each of these seven product categories 326. For example, presume that the products DB 122 includes twenty products marked in these seven categories (e.g., various French breads, baguettes, rolls, and so on, from various different vendors). The products DB 122 includes a product definition for each of these products which, in this example, includes at least a product title and a short description for each product. Each of these relevant product categories 326 and the identified relevant products 328 and associated product data will be used as a source of feature generation in a search recommendation generation operation 330. In other words, in this example, the search recommendation generation 330 has twenty titles and twenty short descriptions for the twenty relevant products 328.

In some examples, the process of generating search recommendations begins with a product catalog 332 step, obtaining updated data about recent active products from catalogue feeds. This updated data includes various attributes of the products, such as product identifiers, product categories, product titles, short descriptions of the product, and so on. Next, the product titles and short descriptions are processed to remove special characters, stop words, extra hyphens, space, and the like at a pre-processing step, preprocess data 334. A set of customized part-of-speech (POS) tagging patterns are used to extract keywords that follow these patterns in a customized patterns 336 step of the process. For example, a pattern may include "[noun][noun] ", "[adjective][adjective]", "[adjective][noun]", "[noun][adjective]" and so on. At KeyBERT model 338 step, the process vectorizes the corpus of data following the given POS patterns using a vectorizer, such as a Keyphrase-CountVectorizer or a similar vectorizer for example. The vectorizer is initialized by using the customized POS patterns and list of stop words as input parameters. The inputs of corpus data, the initialized vectorizer, and the expected number of keyphrases are used by the KeyBERT model to extract the top n keyphrases and their semantic scores. The top n extracted keyphrases whose semantic score is higher than 0.1 are chosen as the recommended searches 350, for example.

In one example, the search recommendation generation operation 330 uses a KeyBERT model 338 to generate recommended searches 350 based on the product attributes generated by the search classification 320 (e.g., the product titles and short descriptions of the relevant products 328). In other examples, any keyword extraction technique or model may be used to create keywords and key phrases that are most similar to a document. More specifically, the KeyBERT model 338 uses the product attributes of the relevant products 328 as the text input to the KeyBERT model 338 (e.g., at pre-process data 334), as well as several customized patterns 336 that are used to dictate how the outputted recommended searches 350 are formatted. For example, the customized patterns 336 can include "[noun]", "[adjective][noun]", "[verb][noun]", "[noun][adjective][verb]", "[noun][adjective][adjective]", or any such combination of nouns, verbs, adjectives, or other such language components. Where the KeyBERT model 338 uses semantic similarity to identify significant terms amongst the body of text input data (e.g., the product titles and short descriptions), the customized patterns 336 are used to format the output of the recommended searches 350 using the most significant terms. As such, each recommended search 350 includes one or more search terms, and is formatted in one of the customized patterns 336.

Given the relevant pre-process data 334 and the customized patterns 336, the KeyBERT model 338 generates the set of recommended searches 350 (e.g., with a relative ranking based on semantic similarity to the input data). In the example, the SR device 120 limits the total number of recommended searches 350 to the most relevant searches 350 (e.g., based on semantic similarity score). In some examples, the SR device 120 is configured to select a predetermined number of the highest ranking recommended searches 350 (e.g., the top 25 recommended searches 350 generated by the KeyBERT model 338) or a predetermined percentage of searches 350 (e.g., the top 10% of searches 350). In other examples, the SR device 120 is configured to select searches 350 that exceed a predetermined threshold (e.g., all searches 350 above a predetermined semantic similarity score). Each recommended search 350 selected at this stage is illustrated in FIG. 3 to FIG. 6 as "$RQ_x$", where x=1 to I (e.g., I=25 recommended searches 350). Continuing the example user search 310 of "bread", some example recommended searches 350 may include "white bread", "bread whole grains", "bakery bread", "bread sandwich white", or "keto bread".

In the example, the SR device 120 generates on or more backend searches 360 for each recommended search 350. The backend searches 360 for a particular recommended search 350 represent different variants for that particular recommended search 350. Each backend search 360 generated at this stage is illustrated in FIG. 3 to FIG. 6 as "$FQ_{xy}$", where x=1 to I (e.g., the index of the recommended searches 350) and y=1 to J (e.g., the index of the backend searches 360 for a particular recommended search 350). For example, the recommended search 350 of "white bread" may have backend searches 360 of "white bread", "plain white bread", "bread white", "sliced white bread", "white bakery bread", "white sandwich bread", or the like. For each recommended query 350, the SR device 120 generates one or more backend search queries 360 based on referenced product attributes. More specifically, FQs are generated based on observance of user search terms and RQ terms in the reference product attributes (i.e., title and short description). In other words, the system checks the order of terms (i.e., user search terms and RQ terms) in the combined title and short description of the reference product, and generate an FQ based on position of each term in the combined text. Terms of a RQ may appear in the combined title and short description of multiple reference products in different orders, in some examples. In these examples, multiple FQs are generated for a single RQ due to various order of terms.

Figure 4:
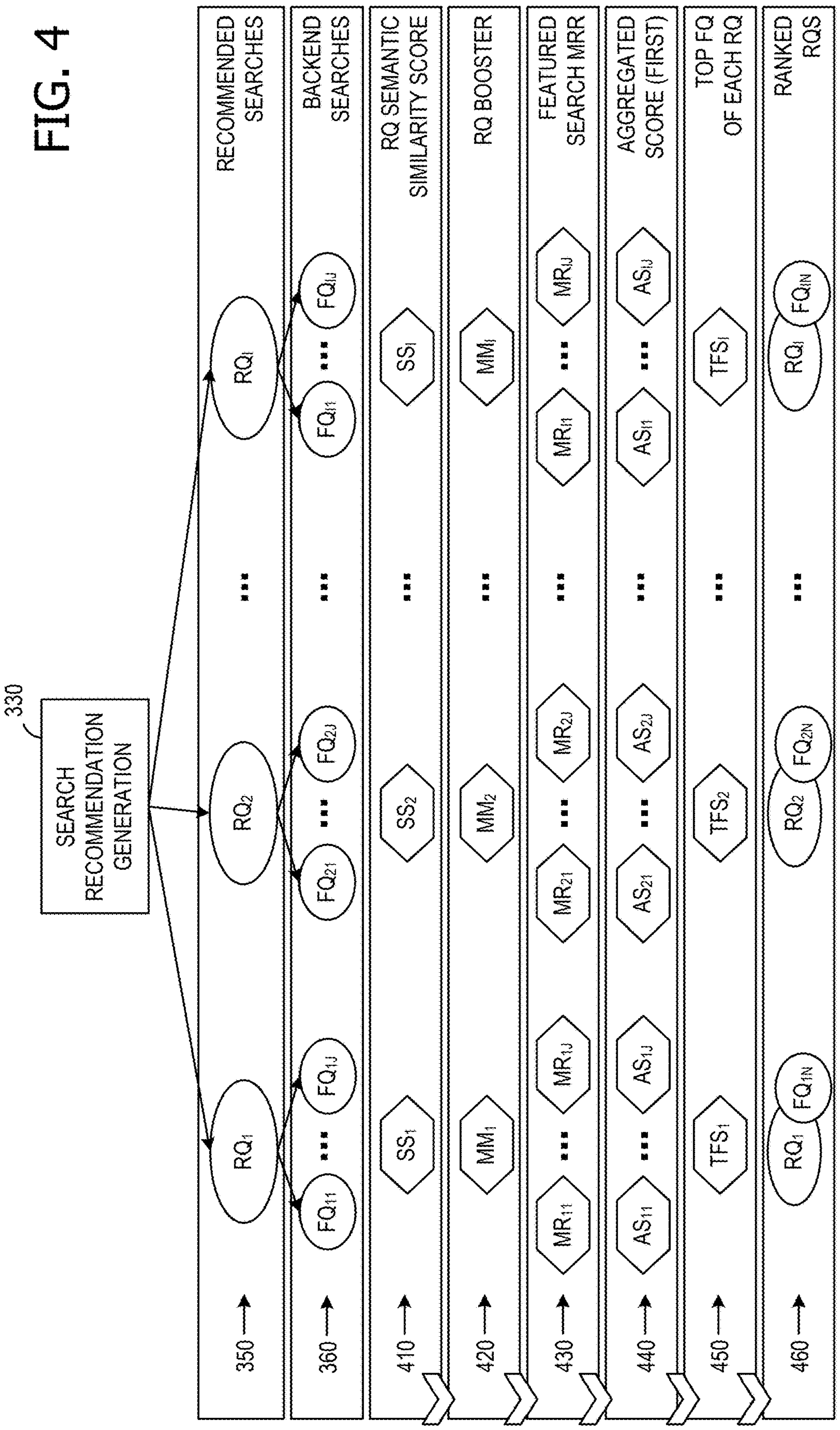
FIG. 4 is a data flow diagram illustrating additional computational steps and associated data components used to rank the recommended searches and backend searches for use in selecting which particular recommended searches to display as the search recommendations shown in FIG. 2.

FIG. 4 is a data flow diagram illustrating additional computational steps and associated data components used to rank the recommended searches 350 and backend searches 360 for use in selecting which particular recommended searches 350 to display as the search recommendations 244 shown in FIG. 2. In this example, the operational steps described in relation to FIG. 4 are performed by the search recommendations device 120 in the architecture 100 of FIG. 1, and may be performed subsequent to the operations shown and described in FIG. 3. The various layers of computations and the process shown in FIG. 4 are used to rank the recommended searches 350, particularly with regard to (A) semantic similarity, (B) a preferred product booster, and (C) a featured search score.

As discussed above with regard to FIG. 3, the search recommendation generation operation 330 yields a set of recommended searches 350 (e.g., $RQ_x$), where each search 350 may have one or more backend searches 360 (e.g., $FQ_{xy}$). In the example, the SR device 120 also identifies a semantic similarity score 410 for each recommended search 350 (e.g., one SS for each RQ). Each semantic similarity score 410 is illustrated in FIG. 4 as "SS,", where x=1 to I (e.g., the index of the recommended searches 350). The similarity scores 410 for each of the recommended searches 350 are generated by the KeyBERT model 338 and the process described in FIG. 3. In other words, the KeyBERT model 338 outputs the semantic similarity score 410 along with the terms of the recommended search 350, and for each recommended search 350.

Further, the SR device 120 also identifies an RQ booster score (or just "RQ booster") 420 for each recommended search 350. Each RQ booster score 420 is illustrated in FIG. 4 as "$MM_x$", where x=1 to I (e.g., the index of the recommended searches 350). In the example, the RQ booster score is added to the score of a RQ if it is a retail-specific query. A query is a retail-specific query if it includes specific words identifying the retailer. This booster score doesn't boost retailer products, it boosts retailer RQ. For example, a user search query for "dinner napkins" may have the RQ "retailer's premium" dinner napkin boosted.

Additionally, the SR device 120 also determines a featured search MRR score ("featured search MRR", or just "MRR score") 430 for each particular backend search 360. Each MRR score 430 is illustrated in FIG. 4 as "$MR_{xy}$", where x=1 to I (e.g., the index of the recommended searches 350) and y=1 to J (e.g., the index of the backend searches 360). The MRR score 430 represents a historical performance score of that particular backend search 360. Historically, the system 100 displays thousands of recommended searches 244 in response to thousands of user searches 142 using the systems and methods described herein. As each of these recommended searches 244 are evaluated and presented to users 102 (e.g., resulting in the displaying of one or more recommended searches 350 and associated backend searches 360), user interaction or performance data is collected and stored (e.g., by the SR device 120) for those user interactions. For example, whenever a particular FQ is selected for presentation to a user 102 in response to a search request 142 (e.g., as one of the displayed search recommendations 244), the SR device 120 captures both ranking data for that FQ within the various search recommendations 244 (e.g., whether the associated RQ appeared first, second, third, and so on, from left to right), as well as user interaction data for that FQ (e.g., whether or not the user 102 clicked on a RQ associated with that FQ, whether the user 102 performed more detailed product inspection under that RQ search 350, whether or not the RQ search 350 resulted in a conversion or sale of a product appearing under that search 350, and so forth). In the example, the MRR score 430 is computed as a mean reciprocal ratio (MRR) score for each backend search 360 based on that historical search performance data.

In the example, the SR device 120 uses the semantic similarity scores (SS) 410, the RQ booster scores (MM) 420, and the featured search MRR scores (MR) 430 to compute a (first) aggregated score 440 for each backend search 360. Each first aggregated score 440 is illustrated in FIG. 4 as "$AS_{xy}$", where x=1 to I (e.g., the index of the recommended searches 350) and y=1 to J (e.g., the index of the backend searches 360). In the example, the aggregated score 440 ($AS_{xy}$) is computed as a sum of the associated semantic similarity score 410, the RQ booster score 420, and the featured search MRR score 430. In other words, $AS_{xy}=SS_x+MM_x+MR_{xy}$ for each particular backend search $FQ_{xy}$ (where that $FQ_{xy}$ is associated with a single $RQ_x$. In some examples, one or more of the scores 410, 420, 430 may instead be used as a weight (e.g., a multiplication factor) to the other score(s) 410, 420, 430. In some examples, any or all of the scores 410, 420, 430 may be individually normalized to some shared domain (e.g., to facilitate aggregation).

As such, at this stage, each backend search 360 ($FQ_{xy}$) for each recommended search 350 ($RQ_x$) has a (first) aggregated score 440 ($AS_{xy}$). In the example, the SR device 120 identifies the top FQ for each RQ 450 (e.g., the highest aggregated score 440 ($AS_{xy}$) under each backend search 360). The top FQ for each RQ 450 is illustrated in FIG. 4 as "$TFS_x$", where x=1 to I (e.g., the index of the recommended searches 350). Accordingly, the SR device 120 identifies one particular FQ as the best backend search 360 to use for each particular RQ. In FIG. 4, the RQ/FQ pairings for each recommended search 350 are illustrated as ranked RQs 460, namely a particular $RQ_x$ with an $FQ_{xN}$), where N is used to represent whichever backend search 360 ($FQ_{x1}$ to $FQ_{xJ}$) scored highest as the top FQ of each RQ 450 ($TFS_x$).

In examples, the SR device 120 uses these ranked RQs 460 to identify which recommended searches 244 to display to the user 102 on the UI 200 (e.g., as search and refinement recommendations 146 in response to the search with search terms 142 of FIG. 1). In some examples, the SR device 120 selects a predefined number of recommended searches 350 to display on the UI 200. In some examples, the SR device 120 dynamically determines how many recommended searches 350 to display based on horizontal space available in the UI 200 on the recommendations bar 240. In some examples, the SR device 120 selects a number of the highest scoring ranked RQs 460 (e.g., based on the top score of $TFS_x$ for all of the ranked RQs 460). In the example shown in FIG. 2, five search recommendations 244, 350 are displayed in the UI 200, namely the top five scoring recommended searches 350.

Figure 5:
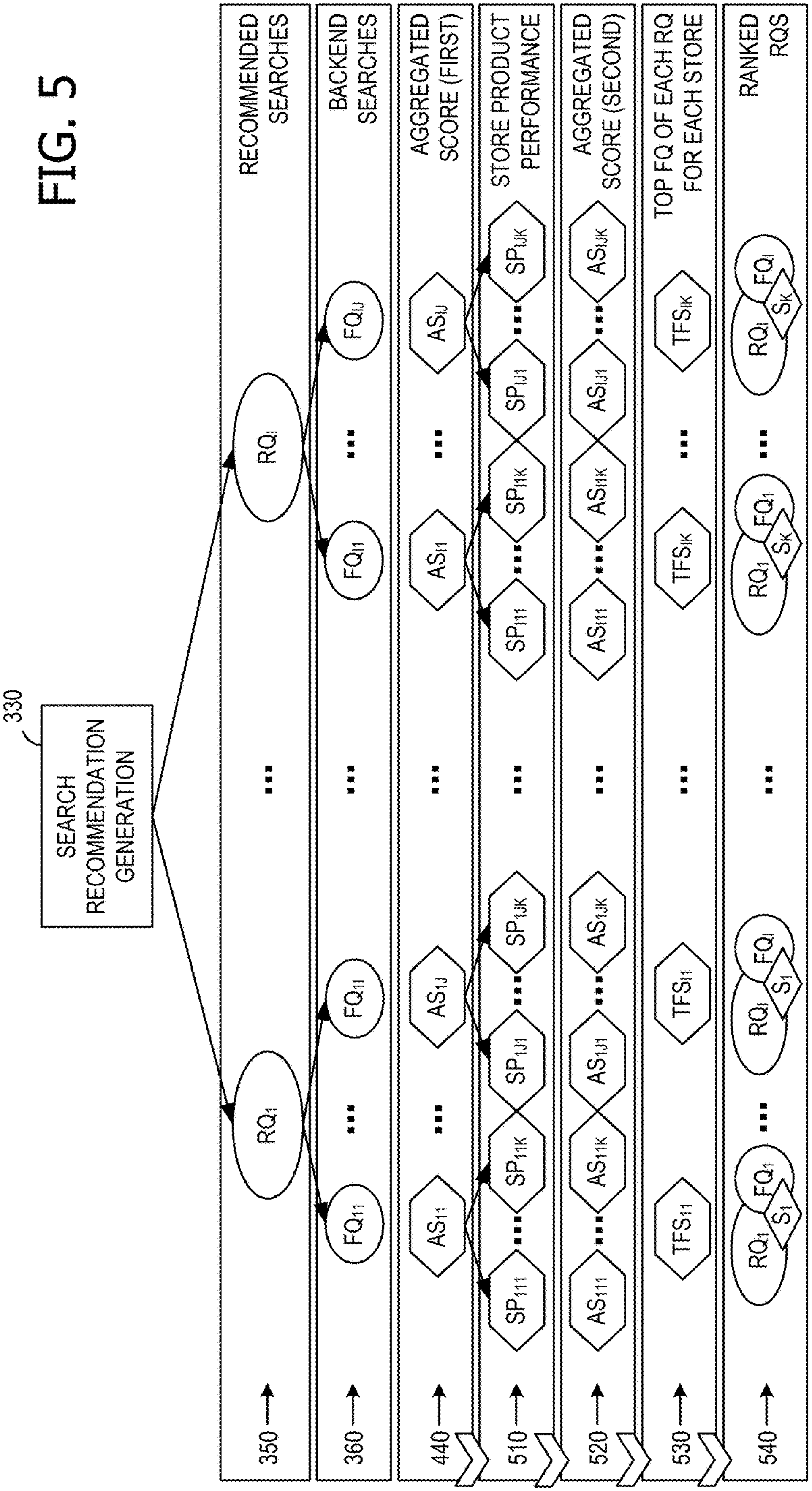
FIG. 5 is a data flow diagram illustrating additional computational steps and associated data components used to rank the recommended searches and backend searches based on product performance data at particular merchant locations.

FIG. 5 is a data flow diagram illustrating additional computational steps and associated data components used to rank the recommended searches 350 and backend searches 360 based on product performance data at particular merchant locations. In this example, the operational steps described in relation to FIG. 5 are performed by the search recommendations device 120 in the architecture 100 of FIG. 1, and may be performed as an extension to the operations shown and described in FIG. 3 and FIG. 4.

As discussed above with regard to FIG. 3 and FIG. 4, the search recommendation generation operation 330 yields a set of recommended searches 350 (e.g., $RQ_x$), where each search 350 may have one or more backend searches 360 (e.g., $FQ_{xy}$), and each backend search 360 ($FQ_{xy}$) also has a (first) aggregated score 440 ($AS_{xy}$). In the example, the SR device 120 also identifies a store product performance score (or just "store product performance") 510 for each backend search 360. Each store product performance score 510 is illustrated in FIG. 5 as "$SP_{xyz}$", where x=1 to I (e.g., the index of the recommended searches 350), y=1 to J (e.g., the index of the backend searches 360), and where z=1 to K (e.g., a store index, where each unique merchant location or "store" is represented by a unique index value).

For example, in addition to the online sales conducted by the marketplace 110, presume the marketplace 110 also includes multiple traditional brick-and-mortar retail stores, also referred to herein as "merchant locations" or "clubs" (e.g.,). Each particular merchant location may offer only a subset of all of the products offered by the marketplace 110 (e.g., some products that are available via the online marketplace 110 may be available at certain merchant locations but not at others). As such, the system 100 tracks various historical product performance metrics for products sold at that merchant location. For any given product, such metrics may include, for example, product availability data (e.g., whether or not that product is sold at that merchant location), product sales performance data (e.g., how many of that product have been sold at that merchant location, an average number of sales of that product in a given period of time at that merchant location, gross or net sales revenues from sales of that product at that merchant location, sale price for that product at that merchant location, or the like), or any variants or combinations thereof. Some products may be more popular at certain locations and less popular at other locations. Some products may generate greater net revenue per unit sold at one merchant location than at another location (e.g., due to differing prices at different locations).

In the example, each particular backend search 360 may identify one or more particular products. As such, for each particular backend search 360 ($FQ_{xy}$) (e.g., each having a particular (first) aggregated score 440 ($AS_{xy}$)), the SR device 120 identifies a store product performance score 510 ($SP_{xyz}$) for the associated product(s) at each of the K merchant locations. For example, presume a particular backend search 360 identifies a particular product, "Sara Lee Honey Wheat Bread, 20 oz. 2 pk." This product may sell well at a first merchant location, only moderately at a second merchant location, and may not be offered for sale at a third merchant location. If, for example, the store product performance score 510 uses an average monthly unit sale amount (e.g., 1,500 per month at the first location, 500 per month at the second location, and 0 per month at the third location), then the integration of the store product performance scores 510 for that particular product (and thus that particular backend search 360) for those particular stores will be valued accordingly.

In the example, each store product performance score 510 for the associated product(s) at the particular merchant location is combined with the (first) aggregate score 440 of a particular backend search 360 to generate a (second) aggregate score 520. Each (second) aggregate score 520 is illustrated in FIG. 5 as "$AS_{xyz}$", where x=1 to I (e.g., the index of the recommended searches 350), y=1 to J (e.g., the index of the backend searches 360), and where z=1 to K (e.g., the index of the various merchant locations). As such, under each backend search 360 ($FQ_{xy}$), there are K store product performance scores 510 ($SP_{xyz}$). Each particular store product performance score 510 ($SP_{xyz}$) is combined with (e.g., added to) the (first) aggregate score 440 ($AS_{xy}$) for that particular backend search 360 ($FQ_{xy}$) to generate a (second) aggregate score 520 ($AS_{xyz}$) for that particular merchant location. In other words, $AS_{xyz}=AS_{xy}+SP_{xyz}$.

In the example, the SP device 120 identifies a top FQ of each RQ for each store 530. In other words, for each merchant location, a top FQ of each RQ is determined (e.g., similar to the top FQ of each RQ 450 shown in FIG. 4). As such, each ranked RQ 540 of FIG. 5 includes a particular recommended search 350 (RQ) and the highest ranking backend search 360 (FQ) for each of the K merchant locations, denoted in FIG. 5 as $S_z$.

During operation, when a particular user 102 is performing the search 142, the SR device 120 may identify a particular merchant location for that user 102. For example, the marketplace 110 may track and store a "favorite" merchant location for the user 102 (e.g., where the user 102 most often performs in-person shopping, based on proximity to a known address of the user 102, based on a profile setting, user selection, or the like). As such, when the user 102 performs the search 142, the SR device 120 identifies the particular merchant location for that user 102 and uses only those ranked RQs 540 for that particular merchant location when evaluating, scoring, and determining which recommended searches 244, 350 to present to the user 102.

Figure 6:
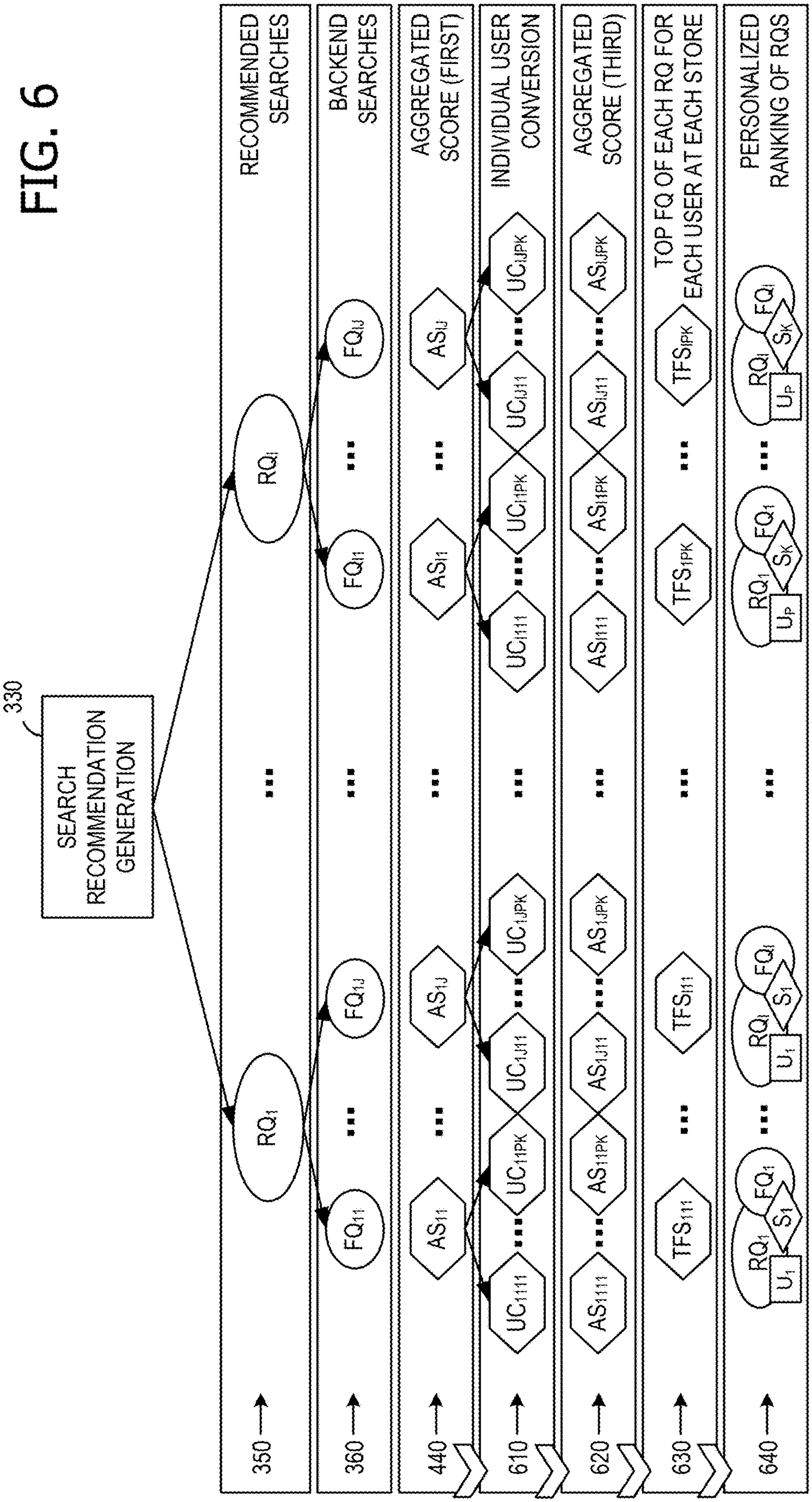
FIG. 6 is a data flow diagram illustrating additional computational steps and associated data components used to provide personalized ranking of the recommended searches and backend searches based on user preference data.

FIG. 6 is a data flow diagram illustrating additional computational steps and associated data components used to provide personalized ranking of the recommended searches 350 and backend searches 360 based on user preference data. In this example, the operational steps described in relation to FIG. 6 are performed by the search recommendations device 120 in the architecture 100 of FIG. 1, and may be performed as an extension to the operations shown and described in FIG. 3 and FIG. 4, and optionally FIG. 5.

As discussed above with regard to FIG. 3 and FIG. 4, the search recommendation generation operation 330 yields a set of recommended searches 350 (e.g., $RQ_x$), where each search 350 may have one or more backend searches 360 (e.g., $FQ_{xy}$), and each backend search 360 ($FQ_{xy}$) also has a (first) aggregated score 440 ($AS_{xy}$). In the example, the SR device 120 also identifies an individual user conversion score (or just "individual user conversion") 610 for each backend search 360. Individual users 102 may, for example, tend to prefer particular products, product brands, types of products, or the like (e.g., based on past in-store or online purchase history, past online interactions, past online searches, or the like). The individual user conversion score 610 represents any such individual user preference metric or combination thereof, but is generally notated here as a "user conversion" for ease of description.

As such, the SR device 120 may track such user preference data over time and may modify the search recommendations based on such user preference data. In the example, each backend search 360 (FQ) identifies one or more product(s), any of which may or may not be included in the user preference data. The SR device 120 thus identifies whether or not this particular user 102 has interacted with each particular product. For those products (and related backend searches 360) for which the SR device 120 has user preference data for that product, and for this particular user 102, the SR device 120 determines an individual user conversion score 610 for that backend search 360. Each individual user conversion score 610 is illustrated in FIG. 6 as "$UC_{xypz}$", where x=1 to I (e.g., the index of the recommended searches 350), y=1 to J (e.g., the index of the backend searches 360), where z=1 to K (e.g., the index of the merchant location), and p=1 to P. Where p is the index of a particular user, and P is the total number of users.

In the example, each individual user conversion score 610 for the associated product(s) at the particular merchant location is combined with the (first) aggregate score 440 of a particular backend search 360 to generate a (third) aggregate score 620. Each (third) aggregate score 620 is illustrated in FIG. 6 as "$AS_{xypz}$", where x=1 to I (e.g., the index of the recommended searches 350), y=1 to J (e.g., the index of the backend searches 360), where z=1 to K (e.g., the index of the various merchant locations), and where p=1 to P. As such, under each backend search 360 ($FQ_{xy}$), there are P individual user conversion score 610 ($UC_{xypz}$). Each particular individual user conversion score 610 ($UC_{xypz}$) is combined with (e.g., added to) the (first) aggregate score 440 ($AS_{xy}$) for that particular backend search 360 ($FQ_{xy}$) to generate a (third) aggregate score 620 ($AS_{xypz}$) for that particular user 102. In other words, $AS_{xypz}=AS_{xy}+UC_{xypz}$.

In the example, the SP device 120 identifies a top FQ of each RQ for each user at each store 630. In other words, for each user 102 at each merchant location, a top FQ of each RQ is determined (e.g., similar to the top FQ of each RQ 450 shown in FIG. 4 or 530 shown in FIG. 5). As such, each personalized ranked RQ 640 of FIG. 6 includes a particular recommended search 350 (RQ) and the highest ranking backend search 360 (FQ) for each user ($S_p$) for each of the K merchant locations.

During operation, when a particular user 102 is performing the search 142, the SR device 120 may identify the user preference data for that user 102 and any or all of the products included in the backend searches 360. As such, when the user 102 performs the search 142, the SR device 120 identifies that particular user 102 and/or merchant location and uses only those ranked RQs 640 for that particular user 102 and merchant location when evaluating, scoring, and determining which recommended searches 244, 350 to present to the user 102.

Figure 7:
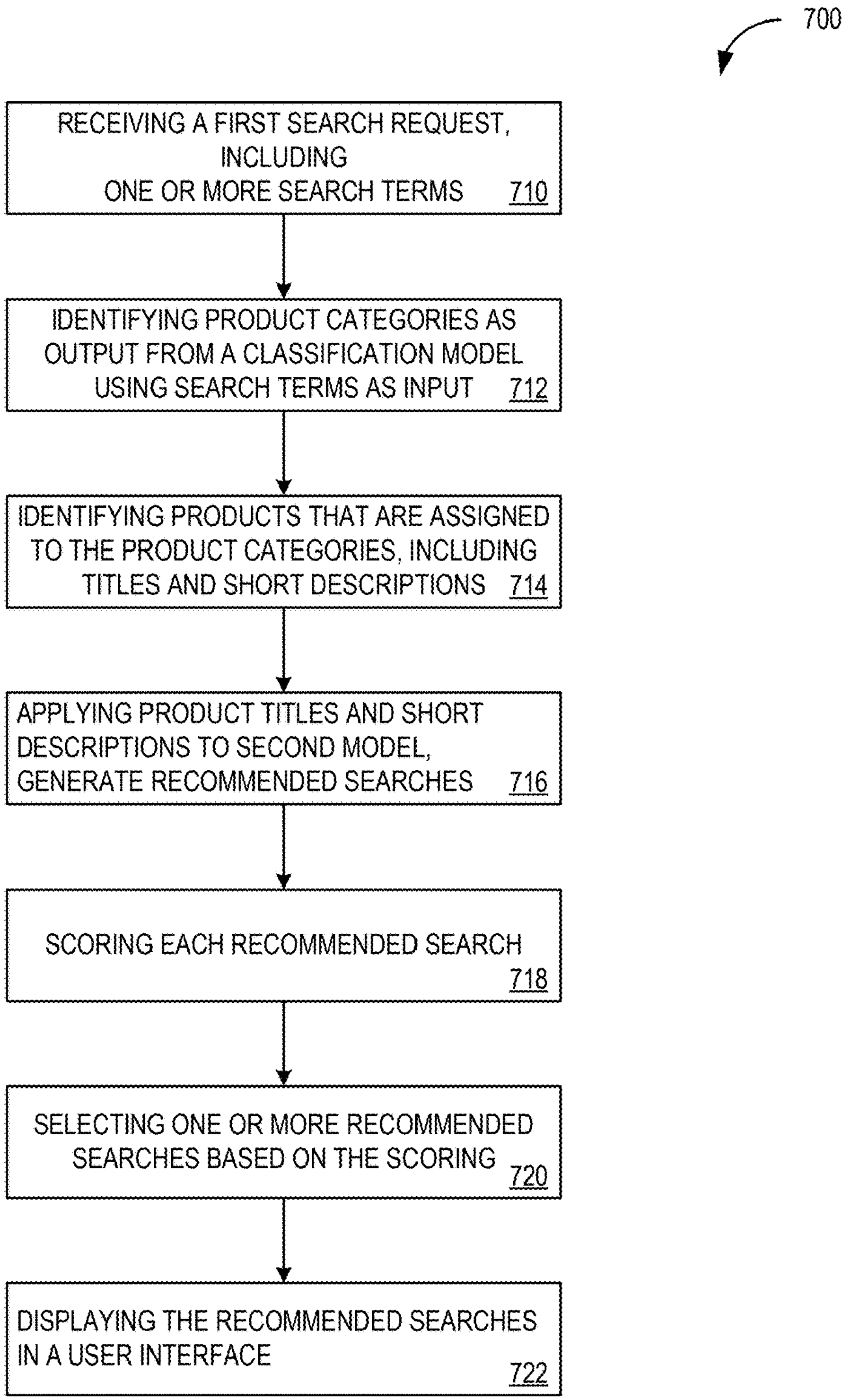
FIG. 7 is a flow chart of an example method for generating search recommendations in response to a user-initiated search.

FIG. 7 is a flow chart 700 of an example method for generating search recommendations in response to a user-initiated search. In examples, the method 700 is performed by the search recommendations device 120 of FIG. 1, and these operations may be similar to the operations shown and described in relation to FIG. 1 to FIG. 6. In the example, at operation 710, the SR device 120 receives a first search request (e.g., search 142, user search 310), the first search request including one or more search terms (e.g., search terms 214). At operation 712, the SR device identifies one or more product categories (e.g., relevant product categories 326) as output from a machine learning classification model (e.g., search classification model 322) in response to inputting of the one or more search terms.

At operation 714, the SR device 120 identifies a first plurality of products that are assigned to the one or more product categories (e.g., relevant products 328), each product of the first plurality of products including a plurality of product titles and a plurality of product short descriptions in a natural language. At operation 716, the SR device applies the plurality of product titles and the plurality of product short descriptions as input to a second machine learning model (e.g., KeyBERT model 338) that is configured to generate a plurality of recommended searches (e.g., recommended searches 350), each recommended search of the plurality of recommended searches including at least one search term. In some examples, the second machine learning model is a KeyBERT model that is configured to use the plurality of product titles and plurality of product short descriptions as a natural language-based first input, and one or more natural language patterns as second input, wherein the second machine learning model is configured to generate the each recommended search of the plurality of recommended searches in a format identified by one of the one or more natural language patterns. In some examples, the second machine learning model is further configured to generate a semantic similarity score (e.g., RQ semantic similarity score 410) for each recommended search of the plurality of recommended searches, wherein scoring each recommended search of the plurality of recommended searches includes scoring each recommended search of the plurality of recommended searches based on an associated semantic similarity score generated by the second machine learning model.

At operation 718, the SR device 120 scores each recommended search of the plurality of recommended searches. In some examples, scoring each recommended search of the plurality of recommended searches includes scoring each recommended search based on one or more of a semantic similarity score (e.g., RQ semantic similarity score 410) and a featured product score (e.g., RQ booster score 420). In some examples, scoring each recommended search of the plurality of recommended searches includes scoring each recommended search of the plurality of recommended searches based at least in part on product performance, at particular merchant locations, of one or more products identified by the associated recommended search.

At operation 720, the SR device 120 selects one or more recommended searches of the plurality of recommended searches based on the scoring. At operation 722, the SR device 120 causes the one or more recommended searches to be displayed as user-interactable components (e.g., as buttons of the recommended searches 244) on a graphical user interface (e.g., UI 200), each user-interactable component being configured to execute a second search request upon user interaction with the user-interactable component.

In some examples, the SR device 120 also trains the machine learning classification model to classify natural language input terms to a plurality of product categories, the training causing the machine learning classification model to be configured to receive one or more search terms in a natural language as input, and to generate one or more product categories as output. In some examples, the SR device 120 also generates one or more backend searches (e.g., backend searches 360) for each recommended search of the plurality of recommended searches, wherein scoring each recommended search of the plurality of recommended searches includes scoring each backend search using a mean reciprocal ratio (MRR) score (e.g., featured search MRR score 430).

Exemplary Operating Environment

Figure 8:
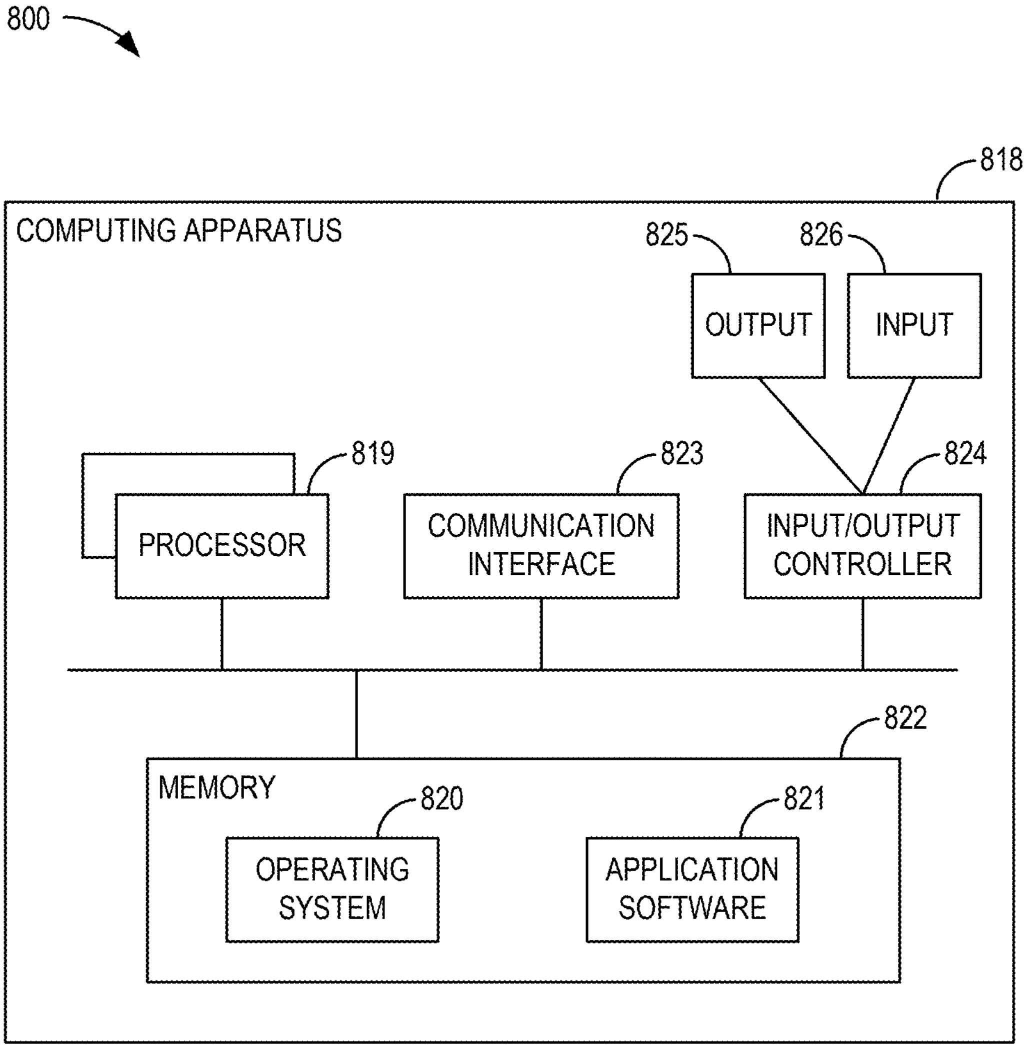
FIG. 8 illustrates a computing apparatus according to an embodiment as a functional block diagram.

The present disclosure is operable with a computing apparatus according to an embodiment as a functional block diagram 800 in FIG. 8. In an example, components of a computing apparatus 818 are implemented as a part of an electronic device according to one or more embodiments described in this specification. The computing apparatus 818 is a computing device, such as, but not limited to, the search recommendations device 120, devices that are a part of computing architecture 112, and user computing device 104 of FIG. 1.

The computing apparatus 818 comprises one or more processors 819 which can be microprocessors, controllers, or any other suitable type of processors for processing computer executable instructions to control the operation of the electronic device. Alternatively, or in addition, the processor 819 is any technology capable of executing logic or instructions, such as a hardcoded machine. In some examples, platform software comprising an operating system 820 or any other suitable platform software is provided on the apparatus 818 to enable application software 821 to be executed on the device.

In some examples, computer executable instructions are provided using any computer-readable medium or media accessible by the computing apparatus 818. Computer-readable media include, for example, computer storage media such as a memory 822 and communications media. Computer storage media, such as a memory 822, include volatile and non-volatile, removable, and non-removable media implemented in any method or technology for storage of information such as computer readable instructions, data structures, program modules or the like. Computer storage media include, but are not limited to, Random Access Memory (RAM), Read-Only Memory (ROM), Erasable Programmable Read-Only Memory (EPROM), Electrically Erasable Programmable Read-Only Memory (EEPROM), persistent memory, phase change memory, flash memory or other memory technology, Compact Disk Read-Only Memory (CD-ROM), digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium does not include a propagating signal. Propagated signals per se are not examples of computer storage media. Although the computer storage medium (the memory 822) is shown within the computing apparatus 818, it will be appreciated by a person skilled in the art, that, in some examples, the storage is distributed or located remotely and accessed via a network or other communication link (e.g., using a communication interface 823).

Further, in some examples, the computing apparatus 818 comprises an input/output controller 824 configured to output information to one or more output devices 825, for example a display or a speaker, which are separate from or integral to the electronic device. Additionally, or alternatively, the input/output controller 824 is configured to receive and process an input from one or more input devices 826, for example, a keyboard, a microphone, or a touchpad. In one example, the output device 825 also acts as the input device. An example of such a device is a touch sensitive display. The input/output controller 824 in other examples outputs data to devices other than the output device, e.g., a locally connected printing device. In some examples, a user provides input to the input device(s) 826 and/or receives output from the output device(s) 825.

The functionality described herein can be performed, at least in part, by one or more hardware logic components. The computing apparatus 818 is configured by the program code when executed by the processor 819 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that are suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions, or the specific components or modules illustrated in the figures and described herein. Other examples of the disclosure include different computer-executable instructions or components having more or less functionality than illustrated and described herein.

In examples involving a general-purpose computer, aspects of the disclosure transform the general-purpose computer into a special-purpose computing device when configured to execute the instructions described herein.

Additional Examples

In some examples, a search recommendations system is provided. The system includes at least one processor; and at least one memory comprising computer-readable instructions, the at least one processor, the at least one memory and the computer-readable instructions configured to cause the at least one processor to: receive a first search request, the first search request including one or more search terms; identify one or more product categories as output from a machine learning classification model in response to inputting of the one or more search terms; identify a first plurality of products that are assigned to the one or more product categories, each product of the first plurality of products identifying a plurality of product titles and a plurality of product short descriptions in a natural language; apply the plurality of product titles and the plurality of product short descriptions as input to a second machine learning model that is configured to generate a plurality of recommended searches, each recommended search of the plurality of recommended searches including at least one search term; score each recommended search of the plurality of recommended searches; select one or more recommended searches of the plurality of recommended searches based on the scoring; and cause the one or more recommended searches to be displayed as user-interactable components on a graphical user interface, each user-interactable component being configured to execute a second search request upon user interaction with the user-interactable component.

In other examples, a computer-implemented method for generating search recommendations in response to a user-initiated search is provided. The method includes: receiving a first search request, the first search request including one or more search terms; identifying one or more product categories as output from a machine learning classification model in response to inputting of the one or more search terms; identifying a first plurality of products that are assigned to the one or more product categories, each product of the first plurality of products including a plurality of product titles and a plurality of product short descriptions in a natural language; applying the plurality of product titles and the plurality of product short descriptions as input to a second machine learning model that is configured to generate a plurality of recommended searches, each recommended search of the plurality of recommended searches including at least one search term; scoring each recommended search of the plurality of recommended searches; selecting one or more recommended searches of the plurality of recommended searches based on the scoring; and causing the one or more recommended searches to be displayed as user-interactable components on a graphical user interface, each user-interactable component being configured to execute a second search request upon user interaction with the user-interactable component.

In still other examples, a computer storage medium having computer-executable instructions is provided. Upon execution by a processor of a computer, cause the processor to at least: receive a first search request, the first search request including one or more search terms; identify one or more product categories as output from a machine learning classification model in response to inputting of the one or more search terms; identify a first plurality of products that are assigned to the one or more product categories, each product of the first plurality of products identifying a plurality of product titles and a plurality of product short descriptions in a natural language; apply the plurality of product titles and the plurality of product short descriptions as input to a second machine learning model that is configured to generate a plurality of recommended searches, each recommended search of the plurality of recommended searches including at least one search term; score each recommended search of the plurality of recommended searches; select one or more recommended searches of the plurality of recommended searches based on the scoring; and cause the one or more recommended searches to be displayed as user-interactable components on a graphical user interface, each user-interactable component being configured to execute a second search request upon user interaction with the user-interactable component.

Alternatively, or in addition to the other examples described herein, examples include any combination of the following:

- receiving a first search request, the first search request including one or more search terms;
- identifying one or more product categories as output from a machine learning classification model in response to inputting of the one or more search terms;
- identifying a first plurality of products that are assigned to the one or more product categories, each product of the first plurality of products including a plurality of product titles and a plurality of product short descriptions in a natural language;
- applying the plurality of product titles and the plurality of product short descriptions as input to a second machine learning model that is configured to generate a plurality of recommended searches, each recommended search of the plurality of recommended searches including at least one search term;
- scoring each recommended search of the plurality of recommended searches;
- selecting one or more recommended searches of the plurality of recommended searches based on the scoring;
- causing the one or more recommended searches to be displayed as user-interactable components on a graphical user interface, each user-interactable component being configured to execute a second search request upon user interaction with the user-interactable component;
- training the machine learning classification model to classify natural language input terms to a plurality of product categories, the training causing the machine learning classification model to be configured to receive one or more search terms in a natural language as input, and to generate one or more product categories as output;
- a KeyBERT model that is configured to use the plurality of product titles and plurality of product short descriptions as a natural language-based first input, and one or more natural language patterns as second input, wherein the second machine learning model is configured to generate the each recommended search of the plurality of recommended searches in a format identified by one of the one or more natural language patterns;
- second machine learning model is configured to generate a semantic similarity score for each recommended search of the plurality of recommended searches, wherein scoring each recommended search of the plurality of recommended searches includes scoring each recommended search of the plurality of recommended searches based on an associated semantic similarity score generated by the second machine learning model;
- generating one or more backend searches for each recommended search of the plurality of recommended searches, wherein scoring each recommended search of the plurality of recommended searches includes scoring each backend search using a mean reciprocal ratio (MRR) score;

scoring each recommended search of the plurality of recommended searches includes scoring each recommended search based on one or more of a semantic similarity score and a featured product score;

scoring each recommended search of the plurality of recommended searches includes scoring each recommended search of the plurality of recommended searches based at least in part on product performance, at particular merchant locations, of one or more products identified by the associated recommended search;

aggregating one or more of a semantic similarity score, a featured product score, a featured search score, a store product performance score, and an individual user conversion score to generate an aggregated score;

selecting a backend search based on a highest aggregated score; and ranking recommended searches based on aggregated scores.

Any range or device value given herein may be extended or altered without losing the effect sought, as will be apparent to the skilled person.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent can take the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute exemplary means for receiving a first search request, the first search request including one or more search terms; identifying one or more product categories as output from a machine learning classification model in response to inputting of the one or more search terms; identifying a first plurality of products that are assigned to the one or more product categories, each product of the first plurality of products including a plurality of product titles and a plurality of product short descriptions in a natural language; applying the plurality of product titles and the plurality of product short descriptions as input to a second machine learning model that is configured to generate a plurality of recommended searches, each recommended search of the plurality of recommended searches including at least one search term; scoring each recommended search of the plurality of recommended searches; selecting one or more recommended searches of the plurality of recommended searches based on the scoring; and causing the one or more recommended searches to be displayed as user-interactable components on a graphical user interface, each user-interactable component being configured to execute a second search request upon user interaction with the user-interactable component.

At least a portion of the functionality of the various elements in FIG. 1 to FIG. 7 can be performed by other elements in FIG. 1 to FIG. 7, or an entity (e.g., processor, web service, server, application program, computing device, etc.) not shown in FIG. 1 to FIG. 7.

In some examples, the operations illustrated in FIG. 1 and FIG. 3 to FIG. 7 can be implemented as software instructions encoded on a computer-readable medium, in hardware programmed or designed to perform the operations, or both. For example, aspects of the disclosure can be implemented as a system on a chip or other circuitry including a plurality of interconnected, electrically conductive elements.

While the aspects of the disclosure have been described in terms of various examples with their associated operations, a person skilled in the art would appreciate that a combination of operations from any number of different examples is also within scope of the aspects of the disclosure.

The term "Wi-Fi" as used herein refers, in some examples, to a wireless local area network using high frequency radio signals for the transmission of data. The term "BLUETOOTH®" as used herein refers, in some examples, to a wireless technology standard for exchanging data over short distances using short wavelength radio transmission. The term "NFC" as used herein refers, in some examples, to a short-range high frequency wireless communication technology for the exchange of data over short distances.

The term "comprising" is used in this specification to mean including the feature(s) or act(s) followed thereafter, without excluding the presence of one or more additional features or acts.

In some examples, the operations illustrated in the figures are implemented as software instructions encoded on a computer readable medium, in hardware programmed or designed to perform the operations, or both. For example, aspects of the disclosure are implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Within the scope of this application, it is expressly intended that the various aspects, embodiments, examples, and alternatives set out in the preceding paragraphs, in the claims and/or in the description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim, accordingly, including the right to amend any originally filed claim to depend from and/or incorporate any feature of any other claim although not originally claimed in that manner.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A search recommendations system comprising:

at least one processor; and at least one memory comprising computer-readable instructions, the at least one processor, the at least one memory and the computer-readable instructions configured to cause the at least one processor to:

train a Bidirectional Encoder Representations from Transformers (BERT) machine learning classification model to classify natural language inputs into relevant product categories based on a training dataset that includes historical interaction data, wherein the historical interaction data indicates previous recommended searches clicked on by a user;

receive a first search request from the user, the first search request including one or more natural language search terms;

input the one or more natural language search terms into the BERT machine learning classification model to obtain one or more product categories as output(s) of the BERT machine learning classification model;

identify a first plurality of products that are assigned to the one or more product categories, each product of the first plurality of products identifying a plurality of product titles and a plurality of product short descriptions in a natural language;

input the plurality of product titles and the plurality of product short descriptions into a machine learning model to obtain a plurality of recommended searches as output(s) of the machine learning model, each recommended search of the plurality of recommended searches including at least one search term, wherein the machine learning model is separate from the BERT machine learning classification model;

score each recommended search of the plurality of recommended searches;

select one or more recommended searches of the plurality of recommended searches based on the scoring; and cause the one or more recommended searches to be displayed as user-interactable components on a graphical user interface, each of the user-interactable components being configured to execute a second search request upon user interaction with the corresponding user-interactable component.

2. The search recommendations system of claim 1, wherein the BERT machine learning classification model configured to receive one or more search terms in a natural language as input, and to generate one or more product categories as output.

3. The search recommendations system of claim 1, wherein the machine learning model is a KeyBERT model that is configured to use the plurality of product titles and plurality of product short descriptions as a natural language-based first input, and one or more natural language patterns as second input, wherein the machine learning model is configured to generate the each recommended search of the plurality of recommended searches in a format identified by one of the one or more natural language patterns.

4. The search recommendations system of claim 1, wherein the machine learning model is further configured to generate a semantic similarity score for each recommended search of the plurality of recommended searches, wherein scoring each recommended search of the plurality of recommended searches includes scoring each recommended search of the plurality of recommended searches based on an associated semantic similarity score generated by the machine learning model.

5. The search recommendations system of claim 1, wherein the computer-readable instructions are further configured to cause the at least one processor to generate one or more backend searches for each recommended search of the plurality of recommended searches, wherein scoring each recommended search of the plurality of recommended searches includes scoring each backend search using a mean reciprocal ratio (MRR) score.

6. The search recommendations system of claim 1, wherein scoring each recommended search of the plurality of recommended searches includes scoring each recommended search based on one or more of a semantic similarity score and a featured product score.

7. The search recommendations system of claim 1, wherein scoring each recommended search of the plurality of recommended searches includes scoring each recommended search of the plurality of recommended searches based at least in part on product performance, at particular merchant locations, of one or more products identified by the associated recommended search.

8. A method comprising:

training a Bidirectional Encoder Representations from Transformers (BERT) machine learning classification model to classify natural language inputs into relevant product categories based on a training dataset that includes historical interaction data, wherein the historical interaction data indicates previous recommended searches clicked on by a user;

receiving a first search request from the user, the first search request including one or more natural language search terms;

inputting the one or more natural language search terms into the BERT machine learning classification model to obtain one or more product categories as output(s) of the BERT machine learning classification model;

identifying a first plurality of products that are assigned to the one or more product categories, each product of the first plurality of products identifying a plurality of product titles and a plurality of product short descriptions in a natural language;

inputting the plurality of product titles and the plurality of product short descriptions into a separate machine learning model to obtain a plurality of recommended searches as output(s) of the separate machine learning model;

scoring each recommended search of the plurality of recommended searches;

selecting one or more recommended searches of the plurality of recommended searches based on the scoring; and causing the one or more recommended searches to be displayed as user-interactable components on a graphical user interface, each of the user-interactable components being configured to execute a second search request upon user interaction with the corresponding user-interactable component.

9. The method of claim 8, further comprising training the BERT machine learning classification model to classify natural language input terms to a plurality of product categories, the training causing the BERT machine learning classification model to be configured to receive one or more search terms in a natural language as input, and to generate one or more product categories as output.

10. The method of claim 8, wherein the machine learning model is a KeyBERT model that is configured to use the plurality of product titles and plurality of product short descriptions as a natural language-based first input, and one or more natural language patterns as second input, wherein the machine learning model is configured to generate the each recommended search of the plurality of recommended searches in a format identified by one of the one or more natural language patterns.

11. The method of claim 8, wherein the machine learning model is further configured to generate a semantic similarity score for each recommended search of the plurality of recommended searches, wherein scoring each recommended search of the plurality of recommended searches includes scoring each recommended search of the plurality of recommended searches based on an associated semantic similarity score generated by the machine learning model.

12. The method of claim 8, further comprising generating one or more backend searches for each recommended search of the plurality of recommended searches, wherein scoring each recommended search of the plurality of recommended searches includes scoring each backend search using a mean reciprocal ratio (MRR) score.

13. The method of claim 8, wherein scoring each recommended search of the plurality of recommended searches includes scoring each recommended search based on one or more of a semantic similarity score and a featured product score.

14. The method of claim 8, wherein scoring each recommended search of the plurality of recommended searches includes scoring each recommended search of the plurality of recommended searches based at least in part on product performance, at particular merchant locations, of one or more products identified by the associated recommended search.

15. A computer storage medium having computer-executable instructions that, upon execution by a processor of a computer, cause the processor to at least:

training a Bidirectional Encoder Representations from Transformers (BERT) machine learning classification model to classify natural language inputs into relevant product categories based on a training dataset that includes historical interaction data, wherein the historical interaction data indicates previous recommended searches clicked on by a user;

receive a first search request from the user, the first search request including one or more natural language search terms;

input the one or more natural language search terms into the BERT machine learning classification model to obtain one or more product categories as output(s) of the BERT machine learning classification model;

identify a first plurality of products that are assigned to the one or more product categories, each product of the first plurality of products identifying a plurality of product titles and a plurality of product short descriptions in a natural language;

input the plurality of product titles and the plurality of product short descriptions into a separate machine learning model to obtain a plurality of recommended searches as output(s) of the separate machine learning model;

score each recommended search of the plurality of recommended searches;

select one or more recommended searches of the plurality of recommended searches based on the scoring; and cause the one or more recommended searches to be displayed as user-interactable components on a graphical user interface, each of the user-interactable components being configured to execute a second search request upon user interaction with the corresponding user-interactable component.

16. The computer storage medium of claim 15, wherein the computer-executable instructions are further configured to cause the processor to train the BERT machine learning classification model to classify natural language input terms to a plurality of product categories, the training causing the BERT machine learning classification model to be configured to receive one or more search terms in a natural language as input, and to generate one or more product categories as output.

17. The computer storage medium of claim 15, wherein the machine learning model is a KeyBERT model that is configured to use the plurality of product titles and plurality of product short descriptions as a natural language-based first input, and one or more natural language patterns as second input, wherein the machine learning model is configured to generate the each recommended search of the plurality of recommended searches in a format identified by one of the one or more natural language patterns.

18. The computer storage medium of claim 15, wherein the machine learning model is further configured to generate a semantic similarity score for each recommended search of the plurality of recommended searches, wherein scoring each recommended search of the plurality of recommended searches includes scoring each recommended search of the plurality of recommended searches based on an associated semantic similarity score generated by the machine learning model.

19. The computer storage medium of claim 15, wherein the computer-executable instructions are further configured to cause the processor to generate one or more backend searches for each recommended search of the plurality of recommended searches, wherein scoring each recommended search of the plurality of recommended searches includes scoring each backend search using a mean reciprocal ratio (MRR) score.

20. The computer storage medium of claim 15, wherein scoring each recommended search of the plurality of recommended searches includes scoring each recommended search of the plurality of recommended searches based at least in part on product performance, at particular merchant locations, of one or more products identified by the associated recommended search.

* * * * *